United States Patent

Ditges

[15] 3,700,205
[45] Oct. 24, 1972

[54] DIE FOR MOLDING PLASTIC PALLETS

[72] Inventor: Ernst Ditges, Herzebrock, Westfalen, Germany

[73] Assignee: Press-Und Stanzwerk Paul Craemer KG, Herzebrock, (Westfalen), Germany

[22] Filed: Feb. 8, 1971

[21] Appl. No.: 113,235

Related U.S. Application Data

[62] Division of Ser. No. 785,812, Dec. 20, 1968, Pat. No. 3,603,272.

[30] Foreign Application Priority Data

Dec. 20, 1967 Germany..........P 15 56 151.0

[52] U.S. Cl..................................249/142, 425/242
[51] Int. Cl. .............................................B28b 7/16
[58] Field of Search ......18/30 WM, 30 WC, 30 WN, 30 WP, 18/DIG. 58, 42 D, 44, 30 PM, 30 PT, 42 R, 34 R, 45 R, 30 WR, 30 WV, DIG. 8; 249/119, 120, 129, 130, 132, 154, 160, 145, 175, 142; 25/118 R, 41 G, 44, DIG. 24; 425/242

[56] References Cited

UNITED STATES PATENTS

| | | |
|---|---|---|
| 3,444,589 | 5/1969 | Bowin....................18/19 A X |
| 3,488,802 | 1/1970 | Passarelli................18/19 P X |
| 3,597,800 | 8/1971 | Silverman...............18/19 P X |
| 1,727,343 | 9/1929 | Guyot.....................249/145 X |
| 1,029,488 | 6/1912 | Burghoff et al.................18/44 |
| 3,502,767 | 3/1970 | Morrison et al........18/30 WN |
| 3,099,061 | 7/1963 | Marchioli et al......25/DIG. 24 |

*Primary Examiner*—Robert D. Baldwin
*Assistant Examiner*—David S. Safran
*Attorney*—Michael S. Striker

[57] ABSTRACT

A two part die for injection molding an integral plastic pallet having a load carrying top portion and a supporting bottom portion each formed by transversely spaced ribs of U-shaped cross section, the die comprising two die sections having each a plurality of spaced webs tapering toward free ends thereof and arranged with respect to each other so that when the die is closed the webs of one section will intermesh and engage without play plane side faces of the other section and so that at the free ends of the webs hollow spaces of U-shaped cross sections are formed for molding the U-shaped ribs.

6 Claims, 7 Drawing Figures

Inventor:
ERNST DITGES

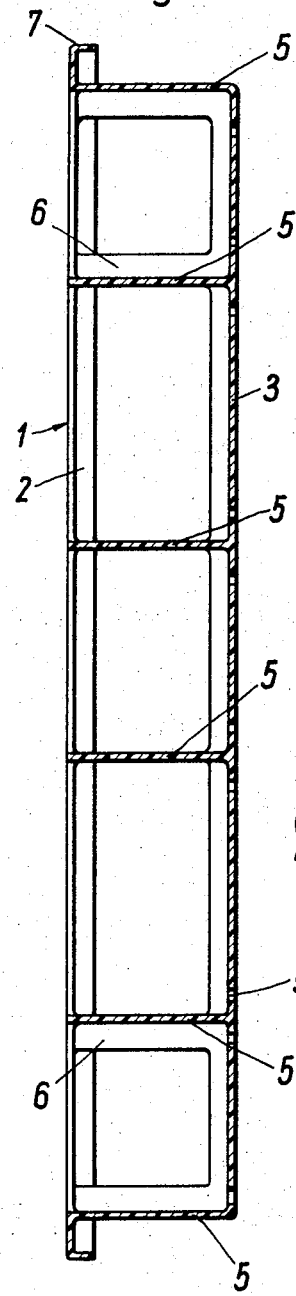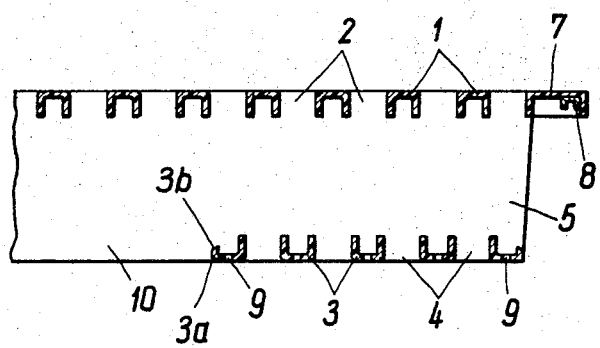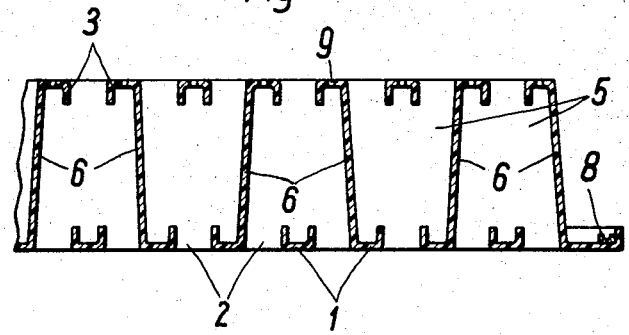

Inventor:
ERNST DIRGES

DIE FOR MOLDING PLASTIC PALLETS

CROSS-REFERENCE TO RELATED APPLICATION

The present invention is a divisional application of the application Ser. No. 785,812 filed Dec. 20, 1968 with the title "PLASTIC PALLET AND DIE FOR PRODUCING THE SAME" now U. S. Pat. No. 3,603,272.

BACKGROUND OF THE INVENTION

Flat pallets are used in material handling operations. Such flat pallets have a top surface for placing a load thereon and a bottom surface which is equally flat. Spacing members are located between the top and bottom surfaces and such pallets have been constructed in the past of different designs and of wood. Wooden pallets, however, become easily damaged during severe handling and heavy loading, and as a result such wooden pallets have only a relatively short life span. In addition, wooden pallets are susceptible to the effects of acids, alkalines, salts and humidity. Furthermore, wood is a good nutrient for the growth of bacteria. Therefore, wooden pallets are not suitable for used in processes involving food supplies. The same also applies to pallets made of steel, since they are readily susceptible to rust, even though their surfaces may be coated or plated.

Accordingly, flat pallets made of synthetic material, such as plastic, have recently been considered. The plastics preferably used for this purpose are polyethylene or polystyrene. Conventional plastic pallets as used in the art, however, have the disadvantage that they have to be assembled of a number of parts. As a result, such pallet assemblies are costly to produce. In addition the load carrying capability and stability of the conventional plastic pallets leaves much to be desired.

SUMMARY OF THE INVENTION

It is an object of the present invention to provide a die for injection molding of integral plastic pallets having a high load carrying capacity.

It is also an object of the present invention to provide for a die of the aforementioned kind which is simple in construction and operation.

With these and other objects in view, the die according to the present invention for injection molding of a plastic pallet mainly comprises two cooperating die sections having faces facing each other and each provided on the respective faces with a plurality of webs spaced from each other in transverse direction. The webs on the face of one die section project and taper toward the face of the other die section, and the webs on the two die sections are arranged with respect to each other in such a manner so as to intermesh free of play and so as to engage each other along planar side faces when the die sections are closed and to form at their tapering ends U-shaped hollow spaces for molding U-shaped ribs of the pallets in which the legs of the U-shaped ribs formed by the webs of one die section are directed toward the legs of the U-shaped ribs formed by the webs on the other die section to thereby provide for a pallet having a top portion and a bottom portion spaced from each other and each formed by U-shaped ribs.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a sectional view taken along the line II—II in FIG. 1;

FIG. 3 is a sectional view taken along the line III—III in FIG. 1;

FIG. 4 is a sectional view taken along the line IV—IV in FIG. 1;

DESCRIPTION OF THE PREFERRED EMBODIMENTS

Figure 1:
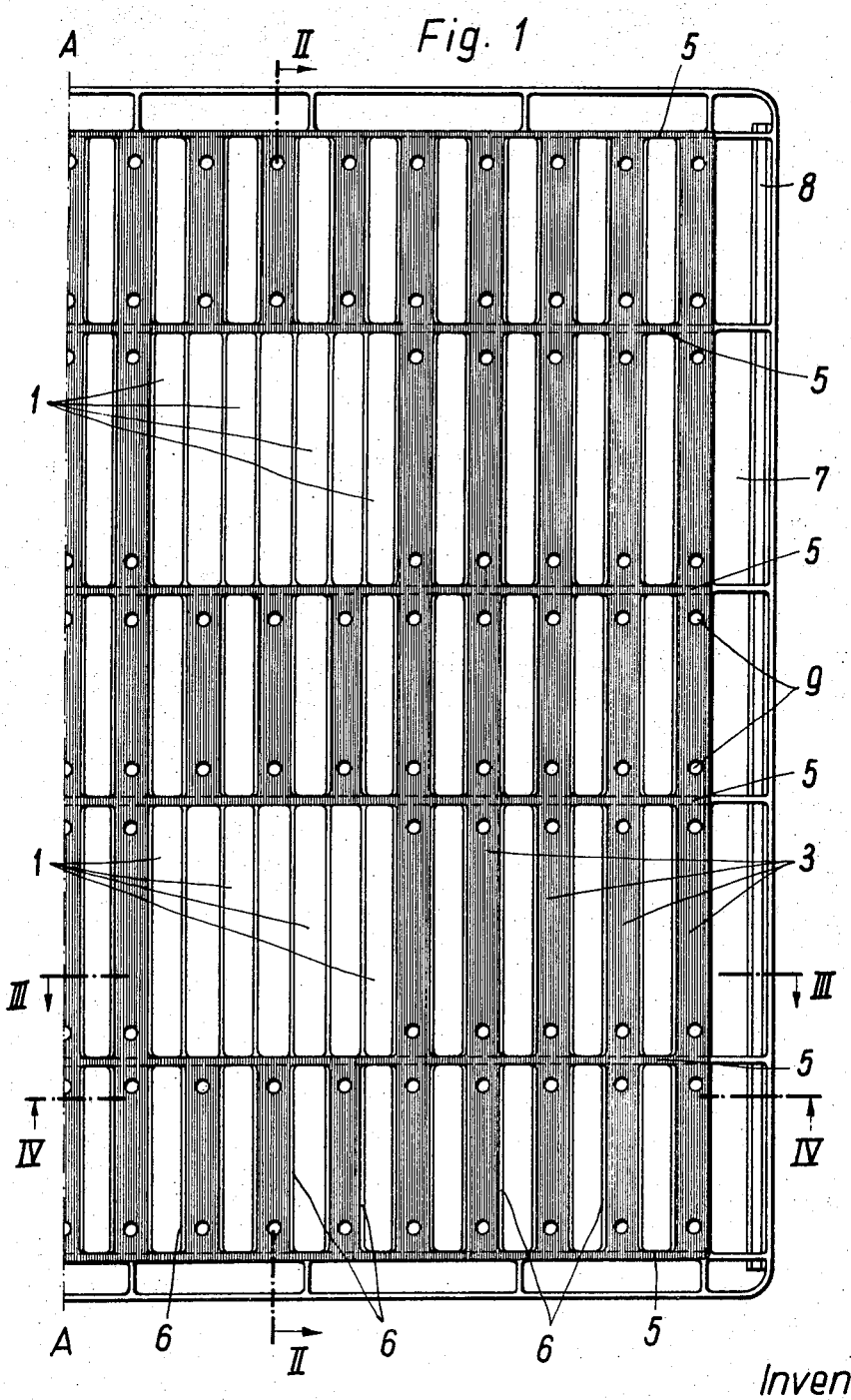
FIG. 1 is a side view of the underside of the pallet, and is taken to one side of the axis of symmetry A—A which is a central axis.
Figure 5:
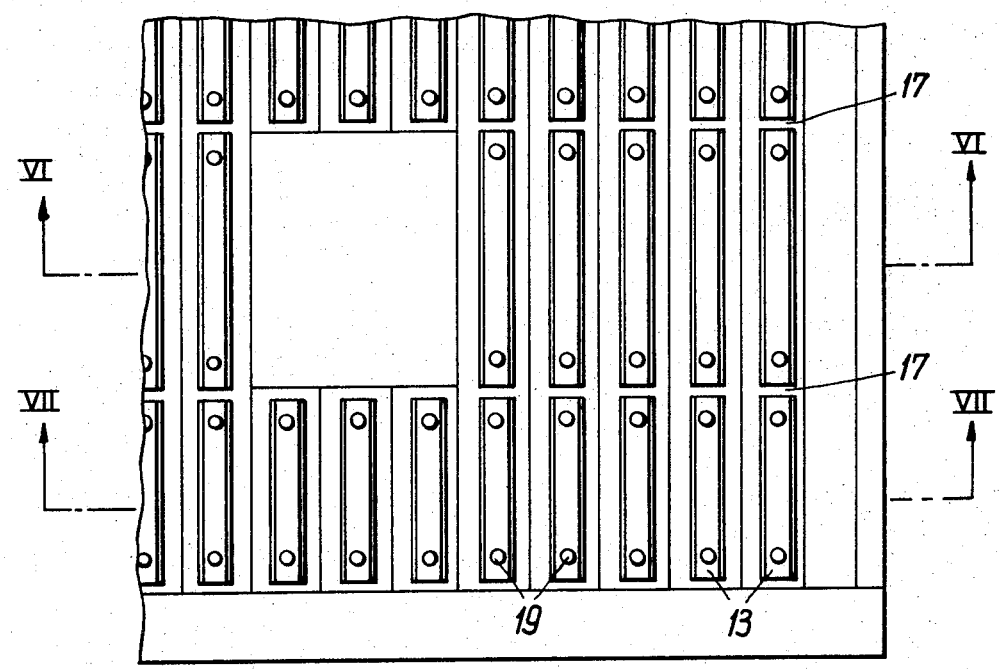
FIG. 5 is a partial top view of the interior side of an injection molded portion for producing the pallet of the construction of FIGS. 1 to 4.

Referring to the drawing, FIGS. 1 to 4 show the top surface of a pallet made of strong synthetic plastic material such as hard polyvinylchloride or polyolefin. A plurality of parallel profiled and U-shaped ribs 1 lie between rectangular recesses 2. At the underside or set-on surface are, similarly, a plurality of parallel profiled and U-shaped ribs 3 lying between rectangular recesses 4. The ribs 1 and 3, as well as the recesses 2 and 4 of both surfaces are displaced in relation to each other. The arrangement is such that the ribs 1 of the top surface lie about the recesses 4 which have a somewhat wider dimension than the ribs 1. The ribs 3, at the same time, on the set-on surface or underside or placement surface are, at the same time, beneath the recesses 2 which are similarly wider in width, to some extent, than the ribs 3. These dimensional relationships and arrangement may be seen by referring to FIGS. 3 and 4.

Between the ribs 1 and 3, and at right angle to them, are vertical flat bridges 5 which serve as spacers. In addition, flat bridges 6 are provided between legs of the U-shaped ribs 1 and 3 which lie substantially vertically opposite to each other outside of the external flat bridges 5. These flat bridges 6 also serve as spacers, and when functioning together with the vertical flat spacers 5 of the pallet, an exceptionally large amount of stability is realized.

The top surface, the placement surface and the flat bridges 5 and 6 are of integral construction and produced through injection molding as a one-piece unit, in accordance with the present invention.

The top surface has a frame 7 which extends beyond all of the sides of the placement surface. This frame 7 has a U-shaped profile similar to the ribs 1 and 3. As shown in FIGS. 3 and 4, angle or U structural members 8 may be injection molded into this frame. These structural members 8 serve to impart additional stability to the tray or pallet. It is also possible to injection mold similar such structural members into the ribs 1 and/or 3. These structural members may be made of iron or other metallic substance.

Holes 9 are provided in the ribs 3 of the placement surface. These holes prevent the accumulation of water or other fluids in the upper open profiles of these ribs.

The placement surface also has four large rectangular recesses 10 which are intended for receiving the running rollers of fork-lift trucks. The legs of the U-shaped ribs 3 bordering the recesses 10 are maintained somewhat flater and inclined, so that driving in and out of the pallets by fork-lift trucks is simplified.

Figure 6:
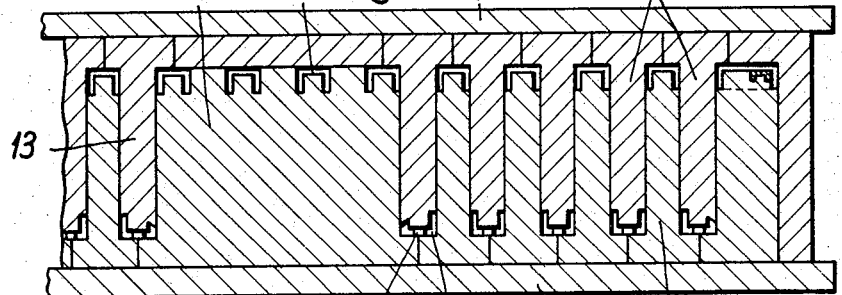
FIGS. 6 and 7 show two different sections at right angles to the die form members used in a die for injection molding of the pallet of FIGS. 1 to 4, respectively taken along the line VI—VI and VII—VII of FIG. 5.
Figure 7:
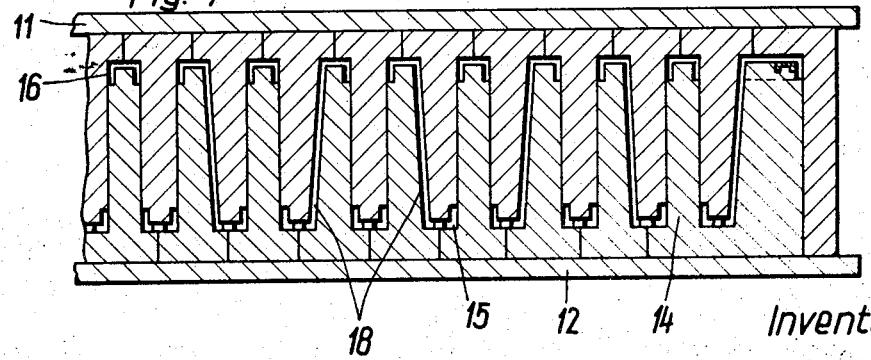

The dies for producing the pallets with the structure described above, consists of two parts 11 and 12, as shown in FIGS. 6 and 7. Both die parts have form members or webs 13 or 14 with plane side surfaces at their inner surfaces and spaced from each other, while at the same time projecting toward each other. The members 13 and 14 are displaced in relation to each other so that when the die is closed, the members reach into each other without play. Hollow spaces 15 and 16 only remain for the purposes of forming the plastic ribs 1 and 3. These hollow spaces 15 and 16 remain at the outer ends of reduced cross section of the members 13 and 14, and are U-shaped.

Between neighboring front surfaces of the members 13 and 14, free gaps 17 are provided for forming the vertical plastic bridges 5 which are at right angle to the ribs 1 and 3. These bridging members such as the member 5, for example, may also be designated as cross members or flange members. A number of members 13 and 14 lying outside of the outer gap 17, furthermore, are designed so that a free gap 18 remains for the purpose of forming the plastic cross member 6, after the die parts 11 and 12 are brought together. The members 13 have, moreover, pins 19 on their outer surfaces, for the purpose of forming holes 9 in the plastic ribs 3.

The recesses 10 serving the purpose of receiving the running rolls of the fork-lift truck are rectangular, and are formed through the rectangular forming member 20 in the die part 12.

The flat pallets made of synthetic or plastic material, in accordance with the present invention, are preferably produced with dimensions of 1,000 × 1,200 mm, 800 × 1,200 mm, and 800 × 1,000 mm. By using identical die elements, these sizes of pallets can be produced in integral or one-piece form through injection molding techniques.

It will be understood that each of the elements described above, or two or more together, may also find a useful application in other types of constructions differing from the types described above.

While the invention has been illustrated and described as embodied in plastic pallets and their dies, it is not intended to be limited to the details shown, since various modifications and structural changes may be made without departing in any way from the spirit of the present invention.

What is claimed as new and desired to be protected by Letters Patent is:

1. A die for injection molding of plastic pallets having a top portion defining a plane top surface for carrying a load to be applied to the pallet, a bottom portion defining a plane bottom surface for supporting the pallet, and spacing portions between said top and bottom portions and wherein the top and bottom portions are formed by substantially parallel U-shaped ribs, arranged spaced from each other to form recesses between said ribs and in which the ribs and recesses of the top portion are displaced relative to those in the bottom portion so that the ribs of the top portion lie over the recesses of the bottom portion and the ribs of the bottom portion lie beneath the recesses of the top portion, said die comprising two cooperating die sections having faces facing each other and each provided on the respective face with a plurality of webs spaced from each other and projecting towards the face of the other die section, each of said webs having a pair of planar side faces and a pair of planar end faces and a free end of reduced cross-section, said webs being arranged in a plurality of adjacent and parallel rows with the end faces of the webs in adjacent rows spaced from and facing each other to define a gap therebetween for forming vertical cross portions extending normal to the ribs of the pallet to be molded and between the top and bottom portions thereof, the webs on said two die sections being arranged in each row with respect to each other so that the webs on said two die sections intermesh free of play when said sections are closed and so as to form between said free ends of the webs on one die section and the adjacent webs on the other die section elongated spaces of U-shaped cross-section for forming said ribs of said pallet.

2. A die as defined in claim 1, wherein some of the side faces of the webs located in the outermost rows of the plurality of rows are arranged with respect to the side faces of adjacent webs to form, when the die sections are closed, a plurality of gaps between said side faces for forming cross portions parallel to and respectively extending between the ribs of the top portion and corresponding ribs of the bottom portion.

3. A die as defined in claim 2, wherein at least some of said webs taper toward said free ends thereof.

4. A die as defined in claim 1, wherein each of said webs is provided on the tapering end thereof with at least one projection extending through said U-shaped space for forming an opening in the respective rib of the pallet.

5. A die as defined in claim 1, wherein each of the die sections comprises a plate and wherein each of said webs has an outer end portion wider than the remainder of the respective web and abutting against the face of the respective plate, each of said wider end portions having a side face abutting against the side face of the end portion of the adjacent web and said free end portion of reduced width of each of said webs on one die section ends short of the corresponding outer end portions of the webs on the other die section, when the die is closed, so as to form said U-shaped space.

6. A die as defined in claim 5 and including a plurality of pins projecting from the free ends of the webs on one direction respectively through the U-shaped spaces in engagement with the wider end portions of respective webs on the other die section.

* * * * *